United States Patent
Kito et al.

(10) Patent No.: US 7,935,932 B2
(45) Date of Patent: May 3, 2011

(54) RADIATION DETECTION APPARATUS

(75) Inventors: Eiichi Kito, Minami-ashigara (JP);
Naoyuki Nishino, Minami-ashigara (JP);
Yasunori Ohta, Yokohama (JP); Hiroshi Tamaoki, Odawara (JP); Tatsuo Iiyama, Kanagawa-ken (JP); Yuto Tanaka, Kawasaki (JP)

(73) Assignee: Fujifilm Corporation, Tokyo (JP)

( * ) Notice: Subject to any disclaimer, the term of this patent is extended or adjusted under 35 U.S.C. 154(b) by 282 days.

(21) Appl. No.: 12/320,582

(22) Filed: Jan. 29, 2009

(65) Prior Publication Data

US 2009/0194700 A1 Aug. 6, 2009

(30) Foreign Application Priority Data

Jan. 31, 2008 (JP) .................... 2008-020300

(51) Int. Cl.
*G01T 1/24* (2006.01)
(52) U.S. Cl. ............... 250/370.09; 250/580; 250/338.1; 250/482.1; 250/370.08; 250/370.01; 378/182; 378/184
(58) Field of Classification Search ............ 250/580, 250/338.1, 482.1, 370.09, 370.08, 370.01; 378/182, 184
See application file for complete search history.

(56) References Cited

U.S. PATENT DOCUMENTS

| 5,712,486 | A | * | 1/1998 | Soltani et al. ............ 250/484.4 |
| D450,385 | S | * | 11/2001 | Salazar et al. ............ D24/158 |
| 6,669,363 | B2 | * | 12/2003 | Nakajo .................... 378/182 |
| 6,683,315 | B2 | * | 1/2004 | Wendlandt et al. ....... 250/484.4 |
| 6,856,670 | B2 | * | 2/2005 | Hoheisel ................. 378/98.8 |
| 7,005,655 | B2 | * | 2/2006 | Stahl et al. ............... 250/484.4 |
| 7,030,404 | B2 | * | 4/2006 | Berger et al. ............. 250/589 |
| 2008/0157002 | A1 | * | 7/2008 | Koren ...................... 250/484.4 |

FOREIGN PATENT DOCUMENTS

JP 3494683 6/1995
JP 2007-067151 3/2007

* cited by examiner

*Primary Examiner* — David P Porta
*Assistant Examiner* — Djura Malevic
(74) *Attorney, Agent, or Firm* — Jean C. Edwards, Esq.; Akerman Senterfitt LLP

(57) ABSTRACT

An electronic cassette has a casing and a radiation detection device accommodated inside the casing, which detects radiation emitted from a radiation source and having passed through a subject, and converts the radiation into radiation image information. The electronic cassette further includes a winding member accommodated rotatably inside of the casing. The radiation detection device includes a flexible base. The radiation detection device is wound on the winding member, and a portion of the radiation detection device is capable of being pulled outside of the casing.

14 Claims, 18 Drawing Sheets

RADIATION DETECTION APPARATUS

CROSS-REFERENCE TO RELATED APPLICATIONS

The present application claims priority from Japanese Patent Application No. 2008-020300, filed Jan. 31, 2008, the contents of which are herein incorporated by reference in their entirety.

BACKGROUND OF THE INVENTION

1. Field of the Invention

The present invention relates to a radiation detection apparatus for irradiating a subject with radiation and capturing a radiation image.

2. Description of the Related Art

In the medical field, a radiation image capturing apparatus, in which radiation is applied to a subject, and radiation that has passed through the subject is directed to a radiation conversion device for capturing a radiation image of the subject, has been widely used.

In this case, as types of radiation detection devices, there are known a radiation film on which a radiation image is exposed and recorded, or a stimulable phosphor panel in which radiation energy is stored as a radiation image in a stimulable phosphor body, and when stimulating light is applied thereto, the radiation image can be read out as stimulated light. In such radiation detection devices, the radiation film in which the radiation image has been recorded is supplied to a developing apparatus where an image developing process is carried out, or the stimulable phosphor panel is supplied to a reading apparatus in which the radiation image is acquired as a visible image by performing a reading process thereon.

On the other hand, in a medical environment such as an operating room or the like, for performing rapid and precise treatments with respect to a patient, it is essential to read out and display the radiation image directly from the radiation detection device. As a radiation detection device capable of responding to such requirements, a radiation detection device has been developed that uses solid state detection elements, which convert radiation directly into electrical signals, or which, after the radiation has been converted into visible light by a scintillator, convert the visible light into electrical signals, which are read out. To facilitate use of the radiation detection device, the device is accommodated inside a casing of a radiation detection apparatus.

In particular, in a transportable type of apparatus, in order for the apparatus to be convenient to carry, it is desirable for the apparatus to be lightweight, and not to have restrictions imposed thereon when transporting or using the apparatus.

As one type of radiation detection apparatus that aims to provide such advantages, for example, the apparatus of Japanese Laid-Open Patent Publication No. 2007-067151 has been proposed.

In the radiation detection apparatus according to Japanese Laid-Open Patent Publication No. 2007-067151, in place of a conventional glass substrate, a flat panel X-ray detecting device (FPD) utilizing a thick film semiconductor is accommodated inside a casing and unitized in this fashion.

However, for enabling the thick film semiconductor to be retained and supported in a flat state, it is necessary for the casing to have a certain rigidity, which restricts the degree to which the casing can be made lightweight. Further, if the size of the flat panel X-ray detection device is variable, capturing of images effectively at a variety of regions can be performed. However, in the radiation detection apparatus of Japanese Laid-Open Patent Publication No. 2007-067151, such a mechanism is not provided. Further, at times when the radiation detection apparatus is not being used, there is a need for storing the radiation detection apparatus in a compact manner on a storage shelf or the like. However, the conventional apparatus has a problem in that this need cannot be met.

SUMMARY OF THE INVENTION

The present invention, taking into consideration the above-mentioned problems, has the object of providing a highly usable radiation image detection apparatus, which can be made lighter in weight, wherein the size at which radiation images are captured thereby can be freely varied, and which can be stored in a compact manner on a storage shelf or the like when the radiation image detection apparatus is not in use.

A radiation detection apparatus according to the present invention includes a casing and a radiation detection device accommodated inside the casing, which detects radiation emitted from a radiation source and having passed through a subject, and converts the radiation into radiation image information. The radiation detection apparatus further includes a winding member accommodated rotatably inside of the casing. The radiation detection device comprises a flexible base, wherein the radiation detection device is wound on the winding member, and a portion of the radiation detection device is capable of being pulled outside of the casing.

The following advantages and effects are offered in accordance with the present invention:

(1) The radiation detection apparatus can be made lighter in weight, so that when transported and used, severe restrictions are not imposed on the technician.

(2) The size at which radiation images can be captured is freely variable, so that capturing of images can be performed effectively at a variety of regions.

(3) The radiation detection apparatus can be stored in a compact manner on a storage shelf or the like when not in use.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Below, a description shall be provided with reference to FIGS. 1 through 18 of embodiments of the radiation detection apparatus according to the present invention.

Figure 1:
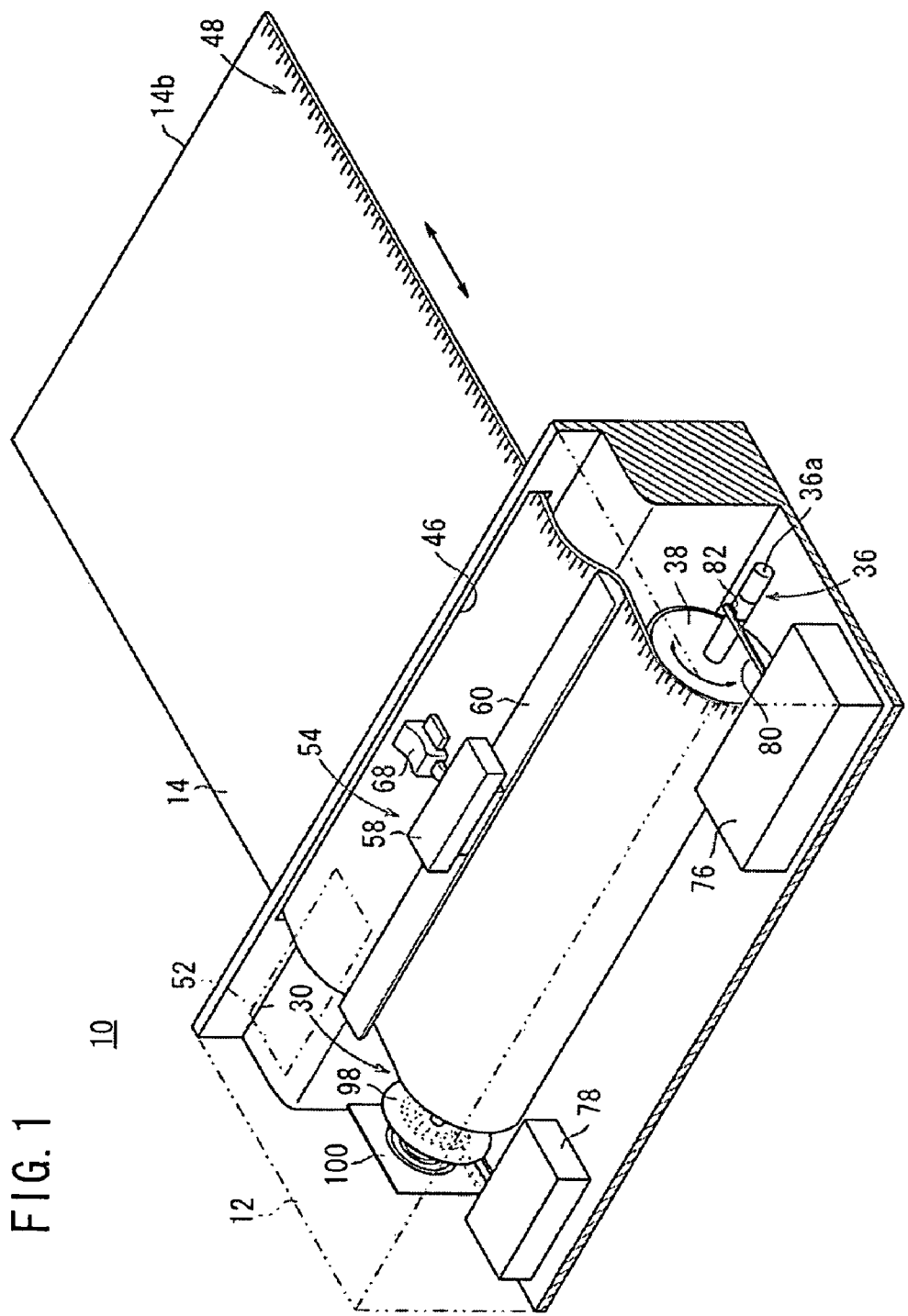
FIG. 1 is a perspective view, partially in see-through, of an electronic cassette.

As shown in FIG. 1, the radiation detection apparatus (hereinafter referred to as an electronic cassette 10) according to the present invention includes a casing 12, the exterior form of which has a roughly rectangular prismatic shape, and a flexible radiation detection device 14 accommodated inside the casing 12, which detects radiation (for example, X-rays) emitted from a radiation source and having passed through a subject (e.g., a patient), and converts the radiation into radiation image information.

Figure 2:
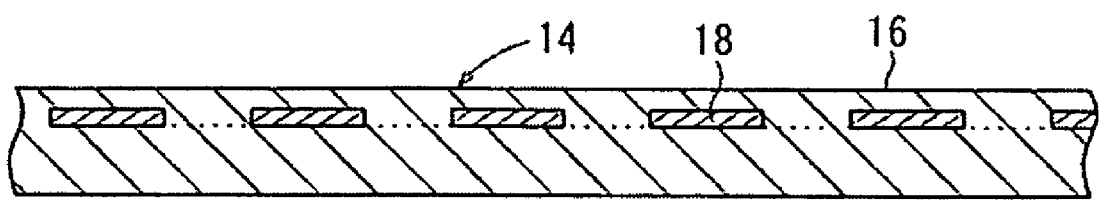
FIG. 2 is a cross sectional view showing a radiation detection device of the electronic cassette.

As shown in FIG. 2, the radiation detection device 14 includes a flexible base 16 formed in an elongate sheet shape, and a plurality of imaging elements (flexible sensors) 18, which are formed on the flexible base 16, such that the radiation detection device 14 can be wound easily.

Figure 3:
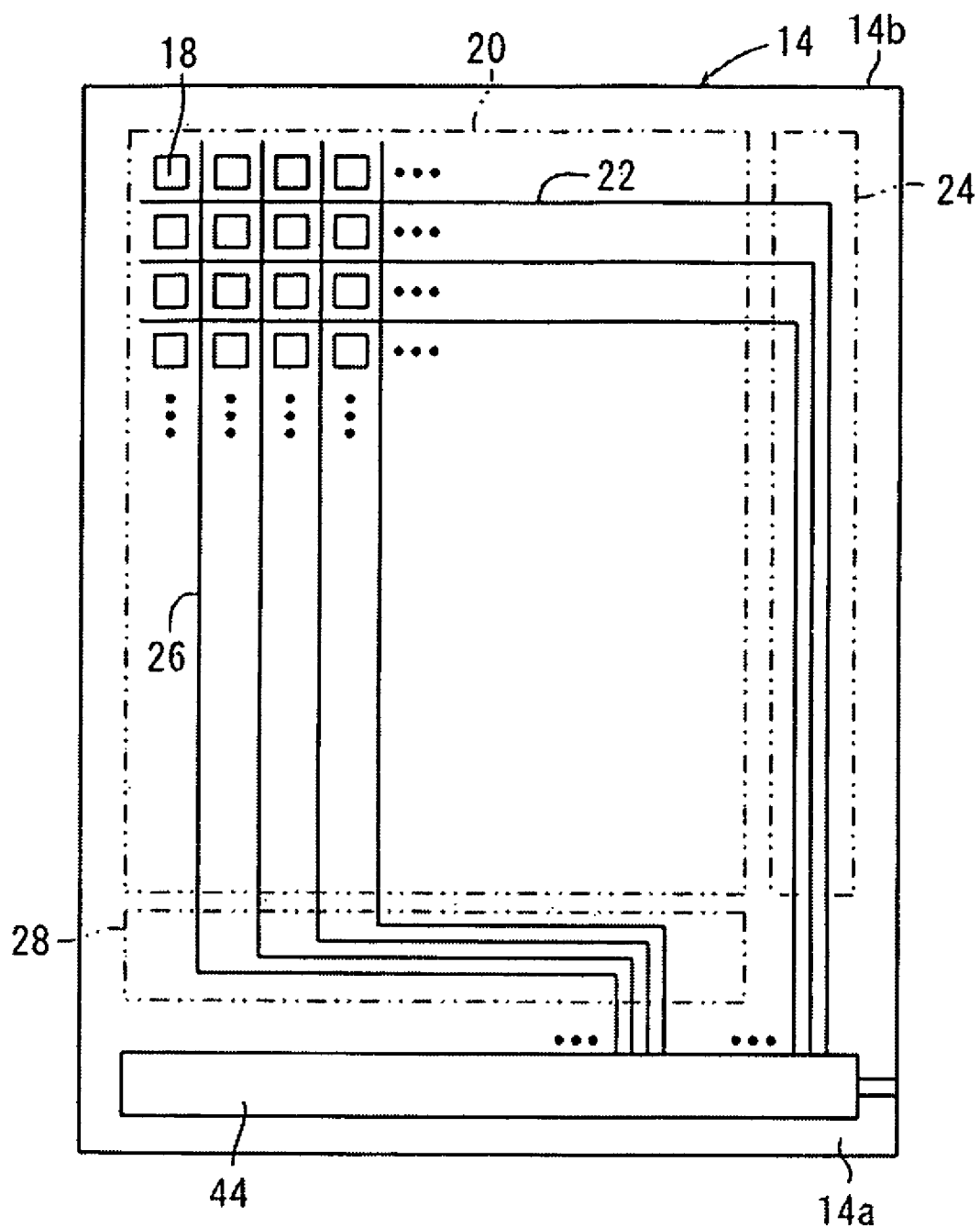
FIG. 3 is a plan view showing a radiation detection device of the electronic cassette.

More specifically, as shown in FIG. 3, the radiation detection device 14 includes a radiation conversion unit 20 formed by a plurality of imaging elements 18, a first flexible wiring section 24 formed by a bundle of gate lines 22 (see FIG. 8), which are wired with respect to the plural imaging elements 18, and a second flexible wiring section 28 formed by a bundle of signal lines 26 (see FIG. 8), which are wired with respect to the plural imaging elements 18.

Further, as shown in FIG. 1, the electronic cassette 10 includes a winding member 30, which is accommodated rotatably inside the casing 12.

Figure 4:
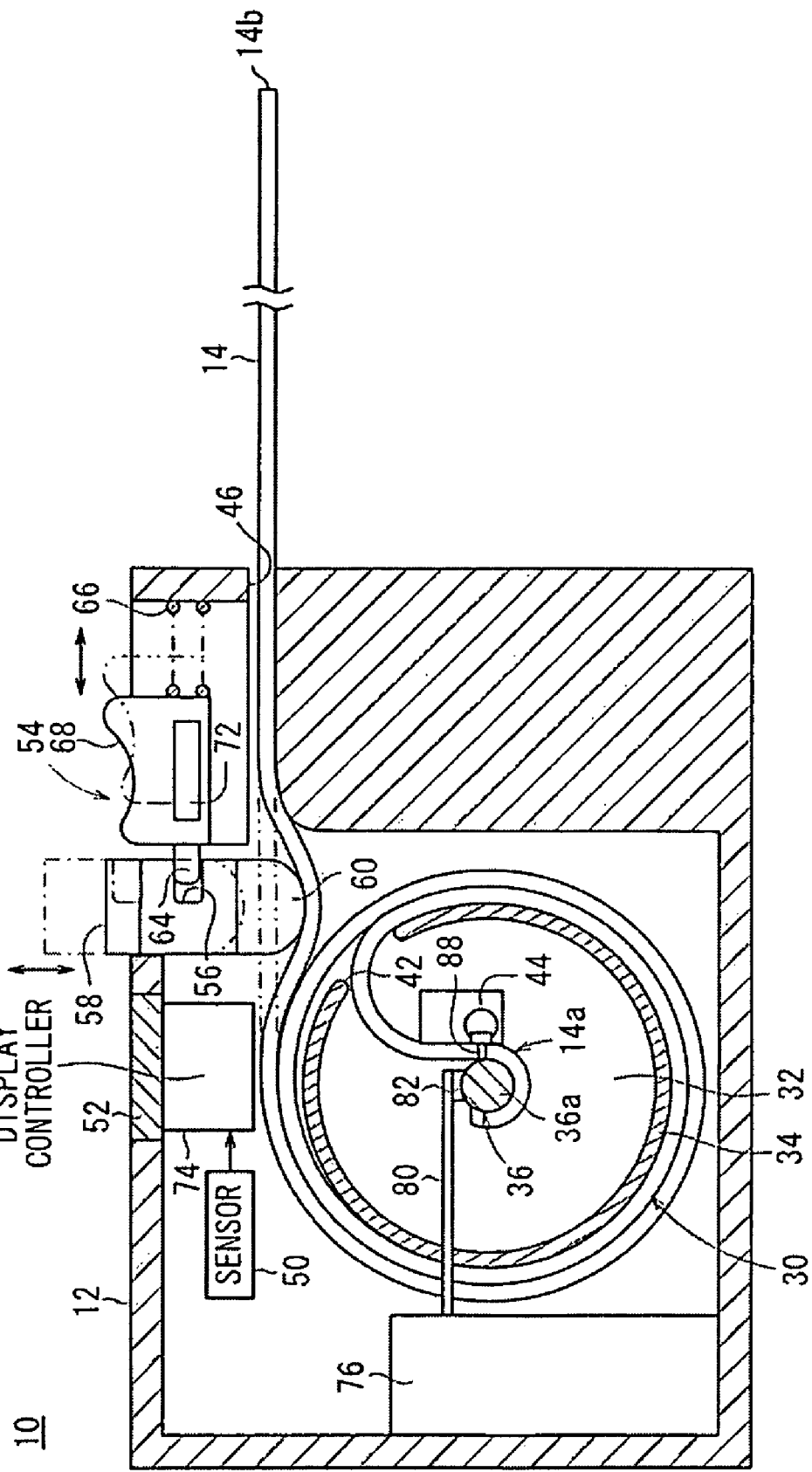
FIG. 4 is a cross sectional view showing an electronic cassette.

As shown in FIG. 4, the winding member 30 includes a cylindrical section 34 having a hollow portion 32 on the inside thereof, a rotary shaft 36 that extends along the axial direction of the cylindrical section 34, and a non-illustrated coil spring attached to the rotary shaft 36. The rotary shaft 36 is fixed to the cylindrical section 34 through disks (see FIG. 10 and FIG. 12; an arrangement of spokes also may be used) provided on both ends of the cylindrical section 34. Accordingly, the cylindrical section 34 is rotatable about the axis of the rotary shaft 36. Both ends of the rotary shaft 36 are rotatably attached to inner walls 12a of the casing 12 through bearings 40 (see FIG. 10 and FIG. 12).

As shown in FIG. 4, the cylindrical section 34 is formed with a slit 42 therein extending in a longitudinal direction at a portion thereof. One end 14a of the radiation detection device 14 is accommodated in the hollow portion 32 of the cylindrical section 34 through the slit 42, and is wound around and fixed to the rotary shaft 36. An electronic circuit 44 is mounted on the end 14a of the radiation detection device 14. The electronic circuit 44 includes a cassette controller 90, a reading circuit 92, a transceiver (signal transmitting/receiving unit) 94, and an image memory 96, for example, as shall be discussed later.

An opening 46 is provided in the casing 12, and the other end 14b of the radiation detection device 14 that is wound around the winding member 30 is exposed through the opening 46. Accordingly, a technician can pull out a portion of the radiation detection device 14 by gripping the other end 14b of the radiation detection device 14. As shown in FIG. 1, a scale 48 is provided on the surface of the radiation detection device 14, so that the amount (size) by which the radiation detection device 14 is pulled out can be visually confirmed easily.

Further, as shown in FIG. 4, a sensor 50 that detects the amount by which the radiation detection device 14 has been pulled out is disposed inside the casing 12. The sensor 50 may comprise a sensor that detects the number of rotations of the cylindrical section 34 or the number of rotations of the rotary shaft 36, or a sensor that optically reads the scale 48 provided on the surface of the radiation detection device 14. The detected value from the sensor 50 is converted into numerical data representing length (pulled out size), and is displayed on a liquid crystal display unit 52 arranged on a surface of the casing 12 that can be viewed easily by a technician.

Moreover, a stopper mechanism 54 is disposed in the casing 12, which enables the pulled out amount of the radiation detection device 14 to be varied. The stopper mechanism 54 is disposed inside the casing 12, for example, in the vicinity of the opening 46 thereof.

For the stopper mechanism 54, for example, a stopper mechanism such as that used by the cord reel of a vacuum cleaner or a measuring tape can be used. However, because the object to be stopped is comparatively large, the stopper mechanism discussed below preferably is used.

Figure 5:
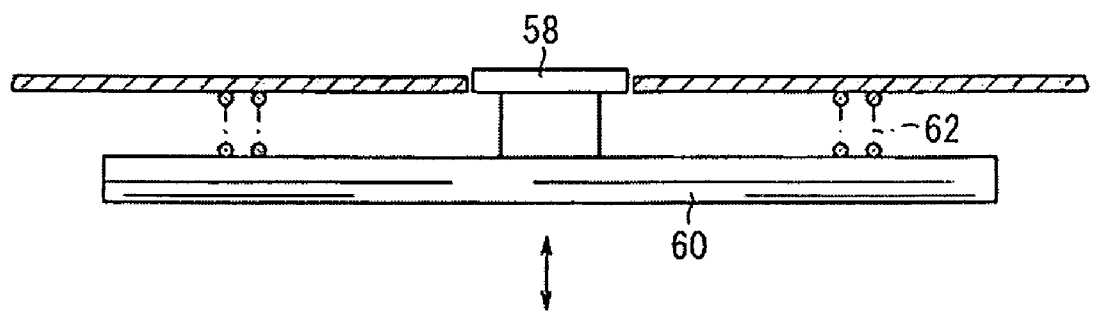
FIG. 5 is an explanatory drawing showing a stop button of a stopper mechanism.
Figure 6:
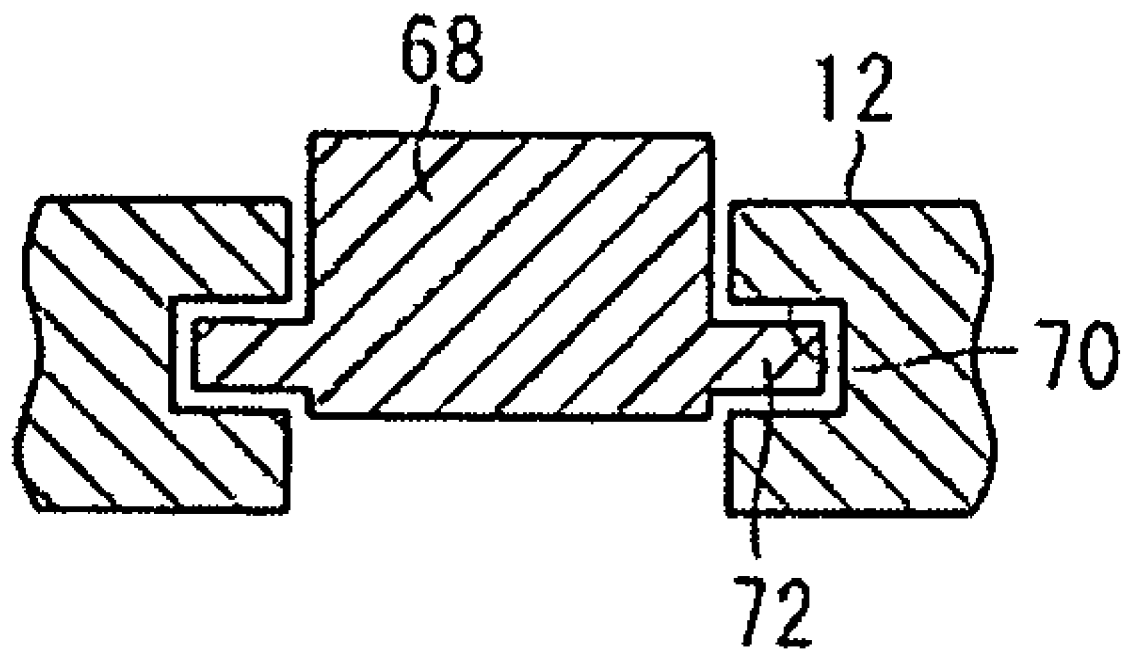
FIG. 6 is a cross sectional view of a release button of the stopper mechanism.

More specifically, as shown in FIGS. 4 to 6, the stopper mechanism 54 includes a stop button 5 (push button) having a concave portion 56 on a side surface thereof, a bar 60 connected to the stop button 58 that presses a portion positioned in the vicinity of the opening 46 within the radiation detection device 14, a first spring 62 (see FIG. 5) that urges the bar 60 in one direction (i.e., a direction separating from the radiation detection device 14), a hook 64 that ingresses into the concave portion 56 of the stop button 58 and latches the stop button 58 in a pressed state, a second spring 66 that urges the hook 64 constantly in one direction (toward the side of the stop button 58), and a release button (slide button) 68 that releases latching of the stop button 58 by the hook 64. Further, as shown in FIG. 6, inside the casing 12, respective grooves 70 are disposed on portions facing side surfaces of the release button 68, which extend along the sliding direction of the release button 68. Further, on side surfaces of the release button 68, projections 72 are disposed, which are inserted into the grooves 70. As a result, latching with respect to the stop button 58 can be carried out reliably by the hook 64.

Accordingly, after the technician has grasped the other end 14b of the radiation detection device 14 and has pulled out a portion of the radiation detection device 14 (i.e., pulled out in opposition to the force of the non-illustrated coil spring) by a necessary length, by pressing the stop button 58, the bar 60 presses the radiation detection device 14 while the end of the hook 64 ingresses into the concave portion 56 on the side surface of the stop button 58, and thus the stop button 58 is latched in place. As a result, the radiation detection device 14, which has been pulled out by a required length, is stopped from being pulled out further, or from being wound up in a reverse direction.

When the radiation detection device 14 is to be stored, by sliding the release button 68, latching of the stop button 58 by the hook 64 is released, whereupon pressing of the radiation detection device 14 by the bar 60 also is released. Therefore, the radiation detection device 14 is wound on the cylindrical section 34 by the force of the non-illustrated coil spring, such that only the other end 14b of the radiation detection device 14 remains exposed from the opening 46.

Further, inside the casing 12, a display controller 74, a battery 76 and an input/output interface 78 (see FIG. 1) are accommodated together with the winding member 30.

The display controller 74 converts the detected value from the sensor 50, which detects the pulled out amount of the aforementioned radiation detection device 14, into numerical data (pulled out size), and displays the data as text data on the liquid crystal display unit 52 arranged on the surface of the casing 12.

The battery 76, as shown in FIGS. 1 and 2, includes an external terminal 80, which extends to one end of the rotary shaft 36 of the cylindrical section 34, with a brush 82 being disposed constantly in contact with the rotary shaft 36 at the end of the external terminal 80.

Figure 7:
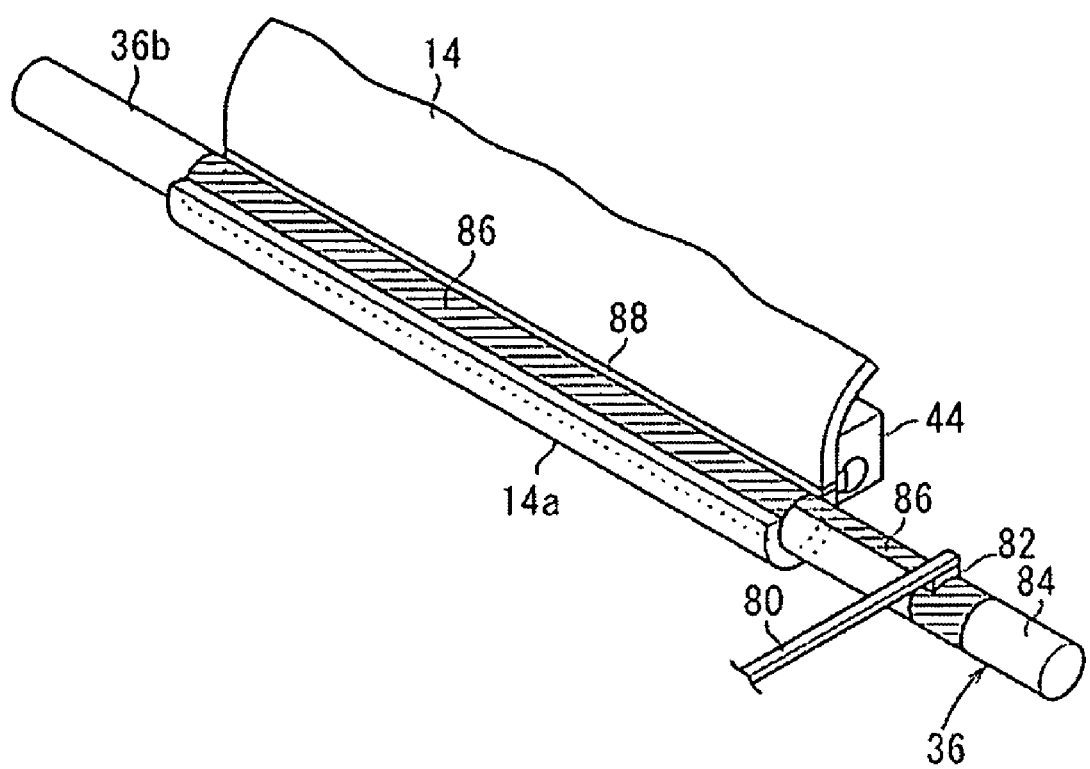
FIG. 7 is an explanatory drawing showing supply of power from a battery by a brush method.

As shown in FIG. 7, the rotary shaft 36 is constructed by forming a metallic layer 86 (shown by slanted cross-hatching) selectively on the surface of a resin shaft member 84. The metallic layer 86 is formed from a portion that is contacted by the brush 82, a portion that contacts a surface at one end of the radiation detection device 14, and a portion interconnecting these two portions. An electronic circuit 44 is mounted onto the other surface at the end 14a of the radiation detection device 14. Additionally, on the one surface of the end 14a of the radiation detection device 14, a wiring pattern (electrical power line 88) for a power source is formed at a portion contacting the metallic layer 86 of the rotary shaft 36, such that electrical power from the battery 76 is supplied to the radiation detection device 14 and the electronic circuit 44 through the electrical power line 88. More specifically, electrical power from the battery 76 is supplied to the radiation detection device 14 and the electronic circuit 44 through the power line 88, i.e., from the external terminal 80 to the brush 82, from the brush 82 to the rotary shaft 36, and from the rotary shaft 36 to the power line 88.

In order to prevent damage to the electronic circuit 44, the battery 76 and the input/output interface 78 inside the winding member 30, due to being irradiated by radiation X, it is preferable for a lead plate or the like to be arranged inside of the casing 12.

Figure 8:
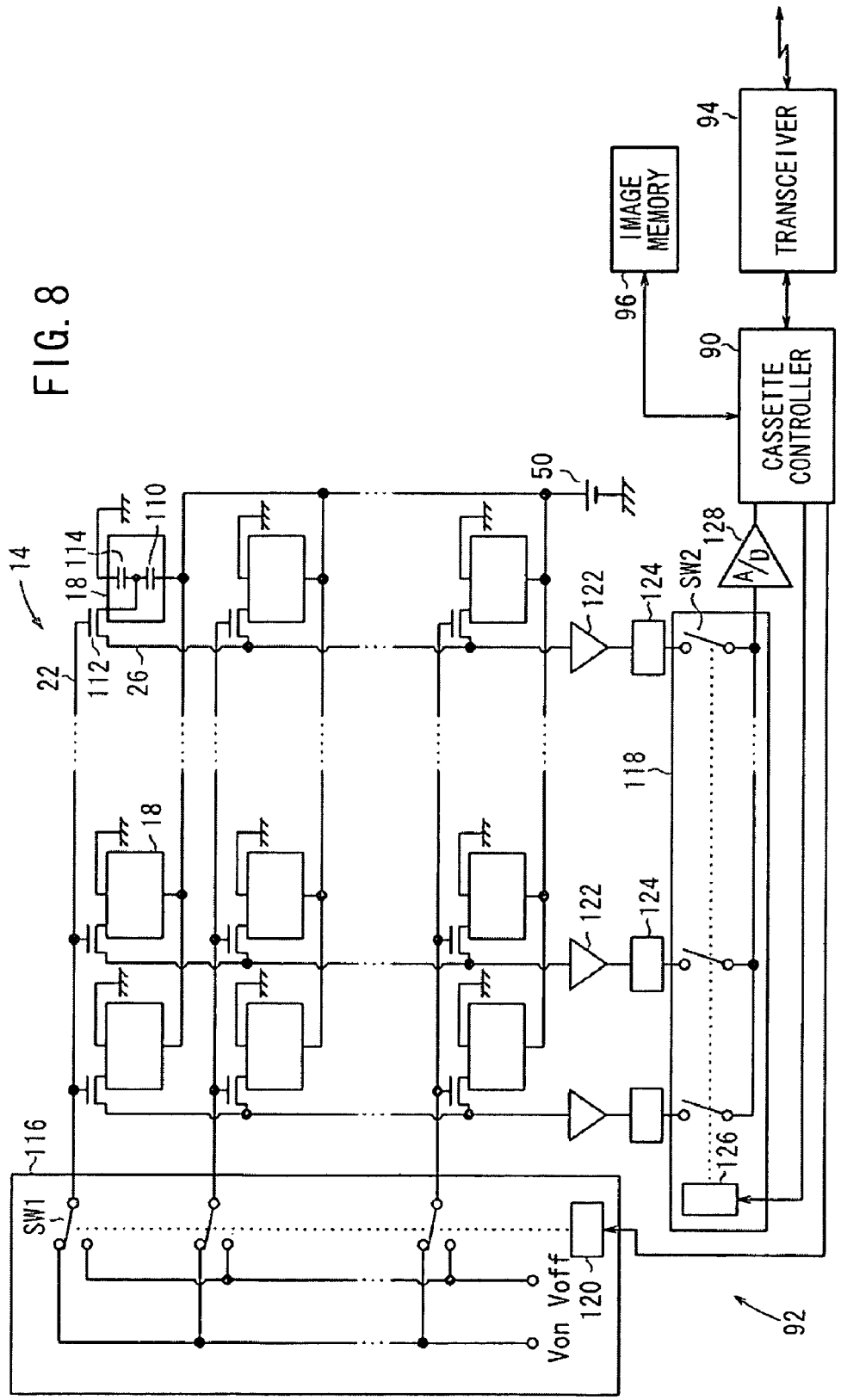
FIG. 8 is a schematic circuit block diagram of a radiation detection device accommodated in an electronic cassette.

As shown in FIG. 8, the electronic circuit 44 includes a cassette controller 90 for controlling driving of the radiation detection device 14, a reading circuit 92 for reading out radiation image information converted by the radiation detection device 14, a transceiver 94 for transmitting and receiving signals, including the radiation image information read out from the reading circuit 92 between the input/output interface 78, and an image memory 96 for temporarily storing the read out radiation image information.

Exchange of signals between the transceiver 94 and the input/output interface 78 can be performed by means of radio waves, having a frequency greater than or equal to 3 kHz and less than or equal to 3 terahertz (THz), or by infrared light. In the case of radio waves, exchange of signals is realized by providing transmitting/receiving antennas respectively on the transceiver 94 and the input/output interface 78.

Figure 9:
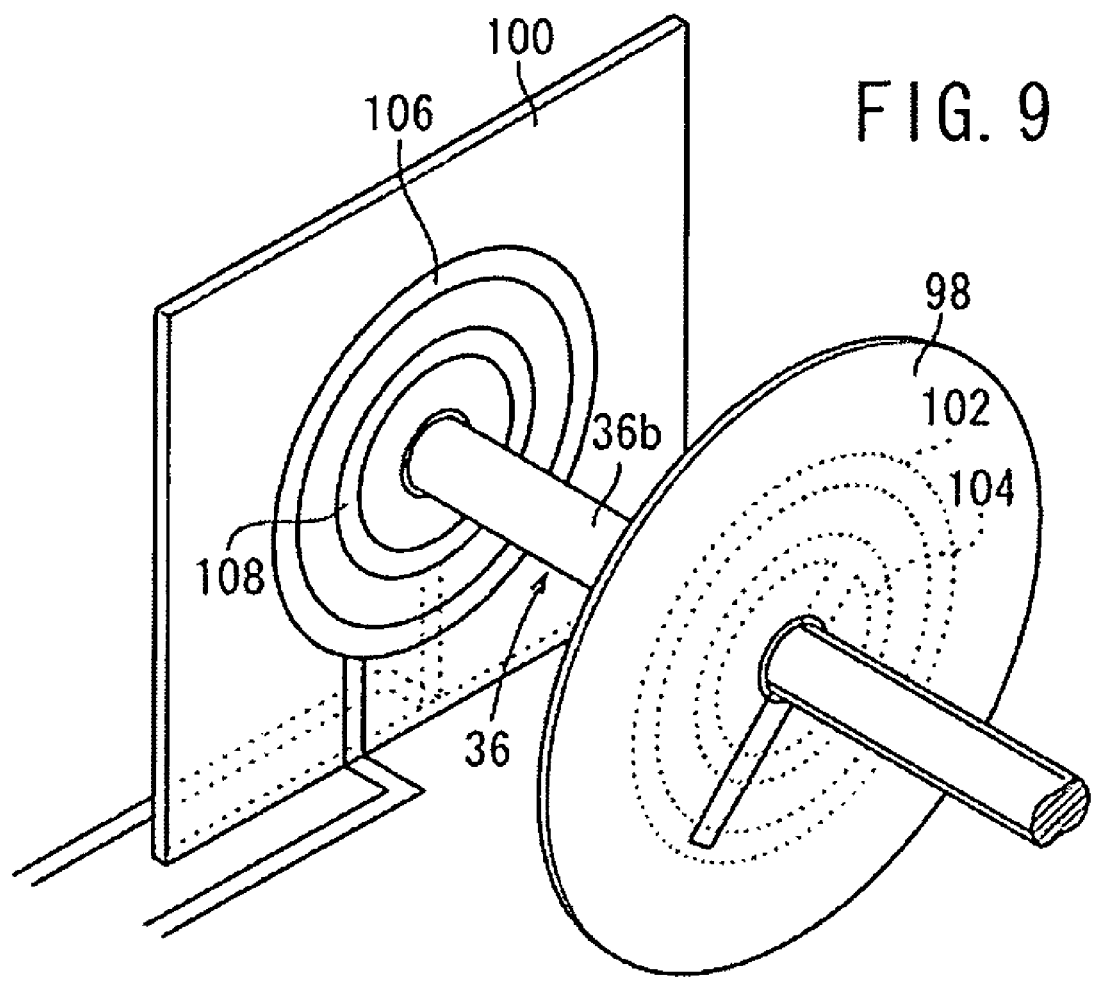
FIG. 9 is an explanatory drawing of an example of information transmission by means of infrared light.
Figure 10:
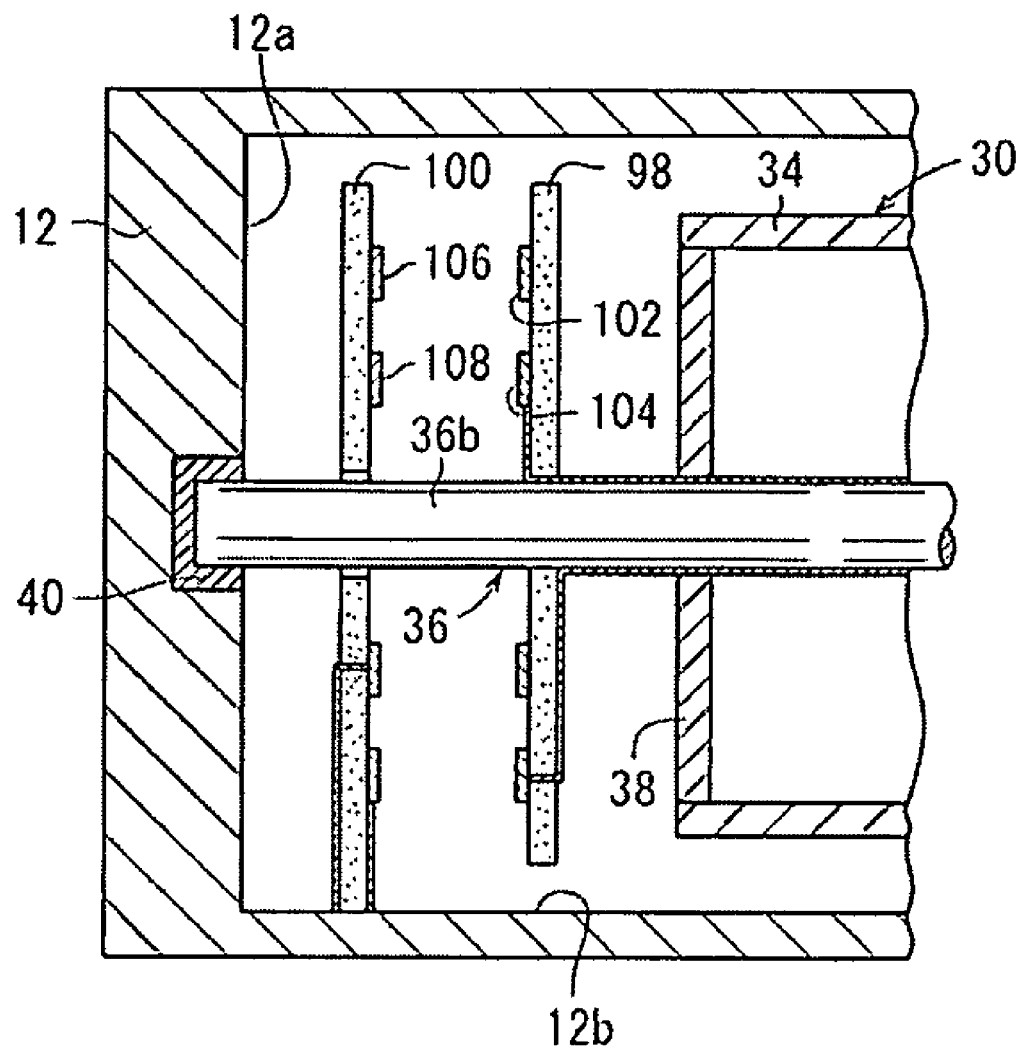
FIG. 10 is a cross sectional view showing, with partial omission, an example of information transmission by means of infrared light.

In the case of infrared light, for example, as shown in FIGS. 9 and 10 (refer also to FIG. 1), on the other end 36b of the rotary shaft 36, a first disk 98 is affixed to the rotary shaft 36 at a position adjacent to the cylindrical section 34, whereas a rectangular shaped first plate member 100 is affixed, for example, to a bottom surface 12b of the casing 12 out of contact with the rotary shaft 36 (i.e., so as not to rotate together with the rotary shaft 36), at a position adjacent to the inner wall 12a of the casing 12. In addition, a ring-shaped first infrared light emitting element 102, and in the same manner, a first infrared light receiving element 104, are disposed on a surface of the first disk 98 facing the first plate member 100. Similarly, a second infrared light receiving element 106 facing toward the first infrared light emitting element 102, and a second infrared light emitting element 108 facing toward the first infrared light receiving element 104, are disposed on a surface of the first plate member 100 confronting the first disk 98.

The electrical connection between the first infrared light emitting element 102 and the electronic circuit 44, and between the first infrared light receiving element 104 and the electronic circuit 44 (in this case, the transceiver 94) is performed through a wiring layer formed on the first disk 98 and the metallic layer formed on the rotary shaft 36. Further, the electrical connection between the second infrared light receiving element 106 and the input/output interface 78, and between the second infrared light emitting element 108 and the input/output interface 78 is performed through a wiring layer formed on the first plate member 100 and the metallic layer formed, for example, on the bottom surface 12b of the casing 12.

As a result, external information (patient information or the like) received at the input/output interface 78 is supplied to the cassette controller 90 through the transceiver 94, i.e., from the second infrared light emitting element 108 to the first infrared light receiving element 104, and from the first infrared light receiving element 104 to the transceiver 94. The information including the radiation image information from the cassette controller 90 is supplied to the input/output interface 78 through the second infrared light receiving element 106, i.e., from the transceiver 94 to the first infrared light emitting element 102, and from the first infrared light emitting element 102 to the second infrared light receiving element 106. The information is then transmitted to the exterior through the input/output interface 78.

As shown in FIG. 8, the radiation detection device 14 includes a structure in which a photoelectric conversion layer 110 made up from an amorphous selenium (a-Se) material or the like, which generates electric charges upon sensing radiation, is disposed over thin film transistors (TFTs) 112 arrayed in a matrix form. After the generated electric charges are accumulated in storage capacitors 114, the TFTs 112 are successively turned on one line at a time, and the electric charges are read out as image signals. FIG. 8 shows the connected relationship of only one of the TFTs 112 and one pixel (imaging element) 18 made up from a photoelectric conversion layer 110 and a storage capacitor 114, whereas the structures of other similar imaging elements 18 have been omitted from illustration for the sake of simplicity. Since the structure of amorphous selenium changes and the functionality thereof is lowered at high temperatures, amorphous selenium must be used within a prescribed temperature range. Accordingly, it is preferable to provide some means for cooling the radiation detection device 14 inside the electronic cassette 10.

Gate lines 22, which extend in parallel to the direction of the rows, and signal lines 26 which extend in parallel to the direction of the columns, are connected to the TFTs 112, which are connected respectively to each of the imaging elements 18. Each of the gate lines 22 is connected to a line scanning driver 116, and each of the signal lines 26 is connected to a multiplexer 118 that constitutes a reading circuit.

Control signals Von, Voff that control ON and OFF states of the TFTs 112 arrayed in the direction of the rows, are supplied from the line scanning driver 116 to the gate lines 22. In this case, the line scanning driver 116 comprises a plurality of switches SW1 that switch the gate lines 22 on or off, and a first address decoder 120, which outputs selection signals for selecting one of the switches SW1. Address signals are supplied from the cassette controller 90 to the first address decoder 120.

Further, electric charges, which are retained in the storage capacitors 114 of each of the imaging elements 18, through the TFTs 112 arranged in the columns are output to the signal lines 26. The electric charges are amplified by amplifiers 122 of the reading circuit 92. The amplifiers 122 are connected through respective sample and hold circuits 124 to the multiplexer 118. The multiplexer 118 comprises a plurality of switches SW2 for switching between the signal lines 26, and a second address decoder 126 for outputting a selection signal for selecting one of the switches SW2 at a time. The second address decoder 126 is supplied with an address signal from the cassette controller 90. An analog-to-digital (A/D) converter 128 of the reading circuit 92 is connected to the multiplexer 118. Radiation image information converted into digital signals by the A/D converter 128 is stored in the image memory 96 through the cassette controller 90. The radiation image information stored in the image memory 96 is transmitted through the transceiver 94 and the input/output interface 78 to a non-illustrated cradle, a portable information terminal, a console, or the like. The radiation image information may be transmitted in a state of being subjected to data compression, as necessary.

Figure 11A:
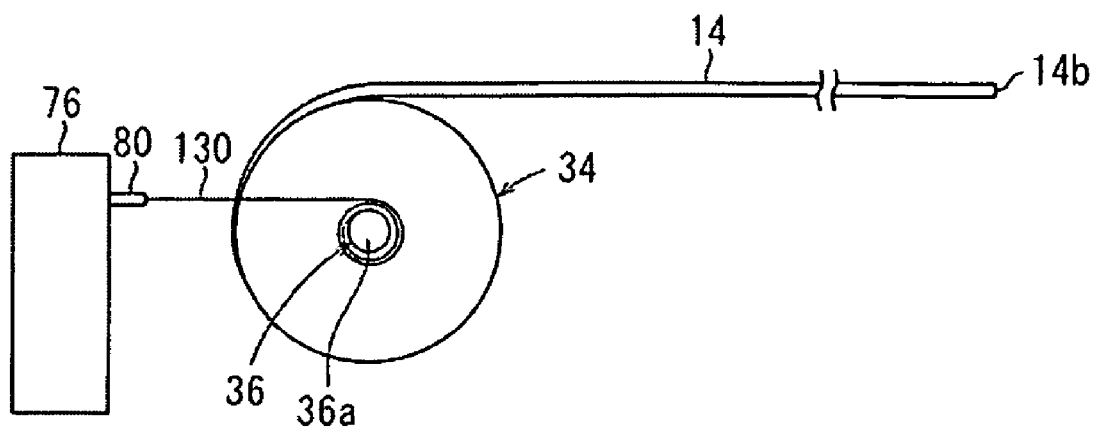
FIG. 11A and FIG. 11B are explanatory drawings showing supply of power from a battery by a wire method.
Figure 11B:
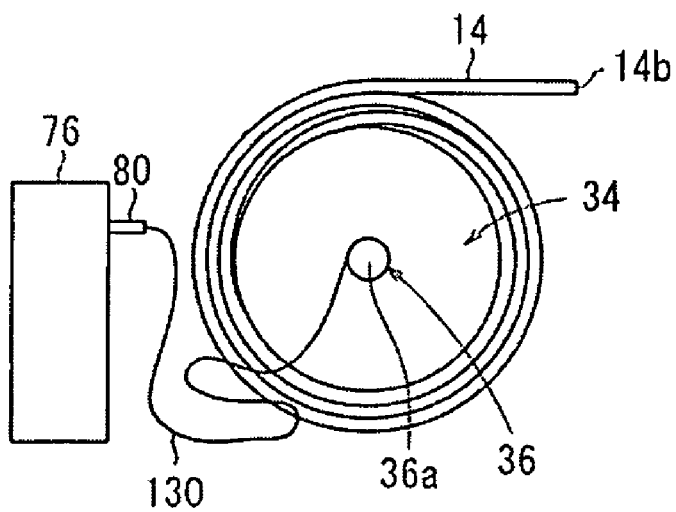

Incidentally, as a method for supplying electrical power from the battery 76 apart from the aforementioned brush method, as shown in FIGS. 11A and 11B, a method (wire method) may be used in which a wire 130 having an insulated cover is connected electrically from the external terminal 80 to one end 36a of the rotary shaft 36. In accordance therewith, electrical power from the battery 76 is supplied to the radiation detection device 14 and the electronic circuit 44 through the power line 88, i.e., from the external terminal 80 to the wire 130, from the wire 130 to the rotary shaft 36 (metallic layer 86), and from the rotary shaft 36 to the power line 88.

In this case, as shown in FIG. 11A, when the radiation detection device 14 is pulled out, the wire 130 preferably is wound around the rotary shaft 36, such that even if the radiation detection device 14 is pulled out to its maximum length, the wire 130 is set with a sufficient length so as not to be cut off or severed. Of course, when the radiation detection device 14 is wound up on the cylindrical section 34, as shown in FIG. 11B, the wire 130 becomes bent. However, since the wire is covered by an insulative covering, unforeseen short-circuiting or the like of the electronic circuit 44 or other circuitry can be prevented.

Figure 12:
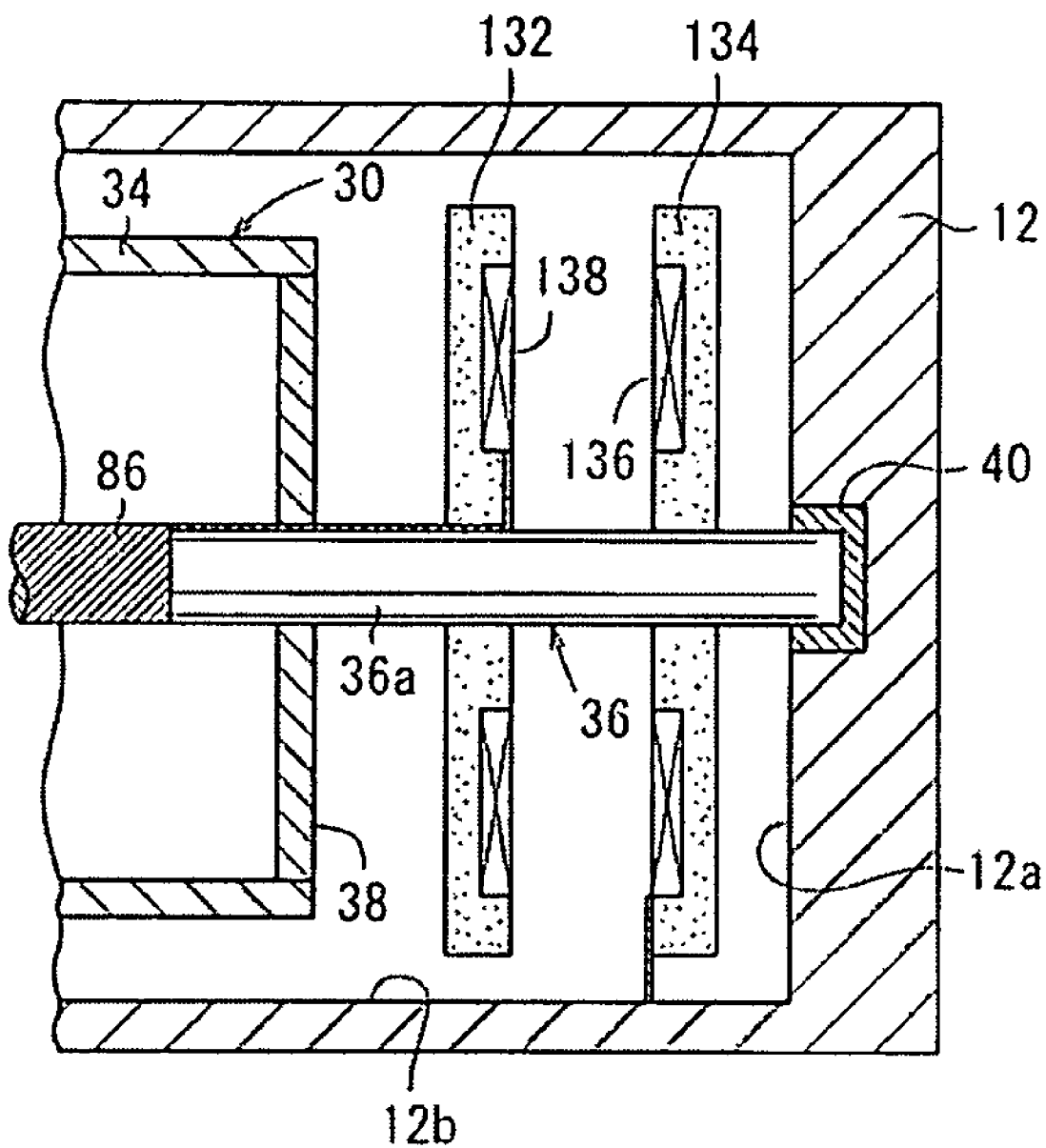
FIG. 12 is an explanatory drawing showing supply of power from a battery by an electromagnetic induction method.

As yet another method for supplying electrical power from the battery 76, an electromagnetic inductance method may also be adopted. With such an electromagnetic inductance method, for example as shown in FIG. 12, at one end 36a of the rotary shaft 36, a second disk 132 is fixed to the rotary shaft 36 at a position adjacent to the cylindrical section 34, whereas a rectangular shaped second plate member 134 is affixed, for example, to a bottom surface 12b of the casing 12 at a position adjacent to the inner wall 12a of the casing 12, out of contact with the rotary shaft 36 (i.e., so as not to rotate together with the rotary shaft 36). In addition, a primary coil 136 is disposed on a surface of the second plate member 134 that confronts the second disk 132, and a secondary coil 138 is disposed on a surface of the second disk 132 that confronts the second plate member 134.

The electrical connection between the secondary coil 138 and the power line 88 (see FIG. 7) is performed through a wiring layer formed on the second disk 132 and the metallic layer 86 formed on the rotary shaft 36. Further, the electrical connection between the primary coil 136 and the battery 76 is performed through a wiring layer formed on the second plate member 134 and a metallic layer formed, for example, on the bottom surface 12b of the casing 12.

Owing thereto, electrical power from the battery 76 is supplied to the radiation detection device 14 and the electronic circuit 44 through the power line 88, i.e., from the battery 76 to the primary coil 136, from the primary coil 136 to the secondary coil 138, from the secondary coil 138 to the metallic layer 86 of the rotary shaft 36, and from the metallic layer 86 to the power line 88.

The electronic cassette 10 is constructed basically as described above. Next, operations and effects using the electronic cassette 10 shall be explained.

When a radiation image is to be captured of the patient, patient information concerning a given patient is set via the console, together with setting required image capturing conditions. Further, a desired image capturing region, for example, the head region, a chest region, or a region of the four limbs, etc., is set from the image capturing menu.

The set patient information, image capturing conditions and image capturing region are transmitted to the portable information terminal held by the technician and displayed on the display device thereof. In this case, the technician confirms the patient information, the image capturing conditions and the image capturing region, which are displayed on the display device of the portable information terminal, so that desired preparations for capturing the image can be carried out.

Next, based on the image capturing conditions and the image capturing region, the technician determines an optimal size for capturing the image from the electronic cassette 10, and pulls out the radiation detection device 14 by an amount suitable for the determined size from the casing 12 of the electronic cassette 10. At this time, the pulled out amount is displayed as numerical data (text) on the liquid crystal display unit 52, so that the technician can confirm at a glance the length by which the radiation detection device 14 has been pulled out. A scale 48 also is provided on the surface of the radiation detection device 14, which is convenient in cases such as when the liquid crystal display unit 52 cannot be easily viewed.

In addition, at a stage where the radiation detection device 14 has been pulled out by a required amount, the technician presses the stop button 58 for thereby fixing the radiation detection device 14 in place. In this condition, the technician positions the pulled out radiation detection device 14 over a desired image capturing region of the patient, which was selected from the image capturing menu.

Once the radiation detection device 14 has been placed in an appropriate state with respect to the patient, the technician operates the image capturing switch of the portable information terminal in order to carry out capturing of the radiation image. When the image capturing switch is operated, the radiation source control device controls the radiation source according to the image capturing conditions supplied beforehand from the console, and thereby irradiates the patient with radiation.

Radiation that has passed through the patient irradiates the radiation detection device 14, which has been pulled out from the casing 12 of the electronic cassette 10, and is converted into electric signals by the photoelectric conversion layer 110 of each of the imaging elements 18 making up the radiation detection device 14. The electric signals are retained as charges in the storage capacitors 114 (see FIG. 8). Next, the electric charge information that forms the radiation image information of the patient stored in each of the storage capacitors 114 is read out in accordance with address signals, which are supplied from the cassette controller 90 to the line scanning driver 116 and the multiplexer 118.

More specifically, the first address decoder 120 of the line scanning driver 116 outputs a selection signal based on the address signal supplied from the cassette controller 90, thereby selecting one of the switches SW1, and supplies a control signal VON to the gate of the TFT 112 that is connected to a corresponding gate line 22. On the other hand, the second address decoder 126 of the multiplexer 118 outputs a selection signal according to the address signal supplied from the cassette controller 90, and successively switches the switches SW2, whereby the radiation image information, which is formed as electric charge information stored in the storage capacitors 114 of each of the imaging elements 18 that are connected to the gate line 22 selected by the line scanning driver 116, is read out in succession through the signal lines 26.

After the radiation image information read out from the storage capacitors 114 of the imaging elements 18 connected to the selected gate line 22 has been amplified by the respective amplifiers 122, the radiation image information is sampled by each of the sample and hold circuits 124, and supplied to the A/D converter 128 through the multiplexer 118 and converted into digital signals. The radiation image information having been converted into digital signals is temporarily stored in the image memory 96 connected to the cassette controller 90.

Similarly, the first address decoder 120 of the line scanning driver 116 successively turns on the switches SW1 according to the address signals supplied from the cassette controller 90, and reads out the radiation image information through the signal lines 26, which is made up of charge information stored in the storage capacitors 114 of each of the imaging elements 18 connected respectively to the gate lines 22, whereupon the radiation image information is stored in the image memory 96 through the multiplexer 118 and the A/D converter 128, as well as through the cassette controller 90.

The radiation image information stored in the image memory 96 is transmitted to the console, for example, by wireless communications through the transceiver 94 and the input/output interface 78.

On the other hand, after the radiation image information stored in the image memory 96 of the electronic cassette 10 is subjected to data compression processing, the information is transmitted to the portable information terminal, where the image can be displayed as a compressed image on the display device of the portable information terminal. The technician can thereby confirm the compressed image displayed on the first display device of the portable information terminal, and can make a determination as to whether repeating of the image capturing process (i.e., capturing another image) is required or not. Because the amount of information is reduced as a result of data compression, the radiation image information can be displayed quickly.

After the radiation image is captured, the technician operates the release button 68 by sliding it, whereupon fixing of the radiation detection device 14 by pressing of the bar 60 is released, and the radiation detection device 14 is wound up on the winding member 30, in a state such that only the other end 14b thereof remains exposed outside of the opening 46.

In this manner, due to the fact that the flexible radiation detection device 14 can be used by being pulled out optionally from the electronic cassette 10, the image capturing capable size thereof can be freely varied, and thus, images can be captured effectively at a variety of regions.

In addition, the electronic cassette 10 can be made lightweight, so that large restrictions are not placed on the technician when transporting or using the electronic cassette 10. Further, when not in use, since the radiation detection device 14 can be wound up and accommodated inside the rectangular prism shaped casing 12, the electronic cassette 10 can be stored in a compact manner on a storage shelf or the like.

In the above-mentioned example, an input/output interface 78 was provided. However, the input/output interface 78 may be dispensed with, and communications with the exterior may be carried out through the transceiver 94 of the electronic circuit 44, thus making the electronic cassette 10 lighter in weight.

Next, with reference to FIGS. 13 through 17, a radiation detection apparatus (hereinafter referred to as an IP cassette 150) according to a second embodiment of the invention shall be explained. Structural elements thereof which are the same as those of the electronic cassette 10 are designated with the same reference numerals and detailed explanations of such features shall be omitted.

The IP cassette 150 has substantially the same structure as the above-described electronic cassette 10, but differs therefrom in the following points.

Figure 13:
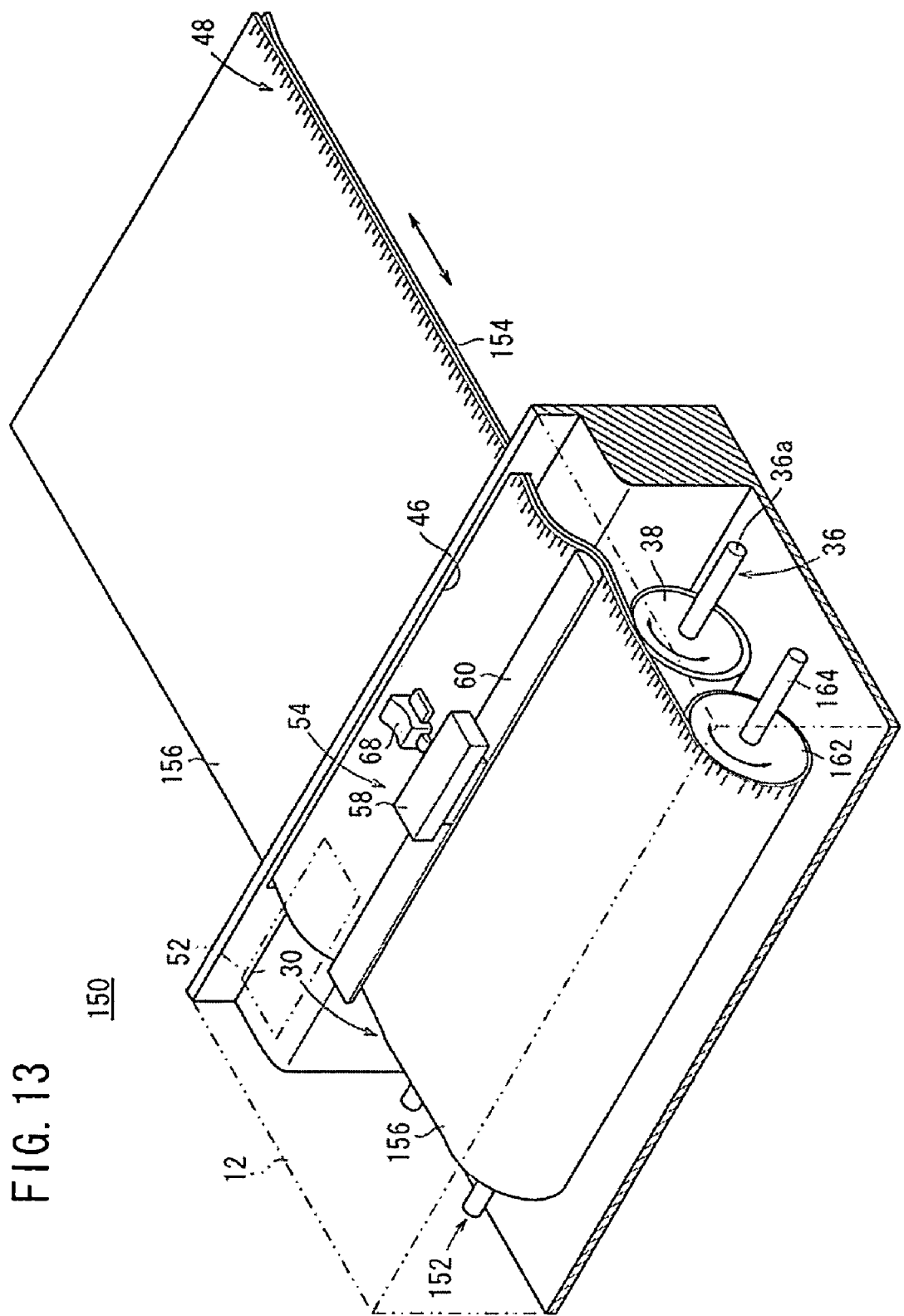
FIG. 13 is a perspective view showing, partially in see-through, an IP cassette.
Figure 14:
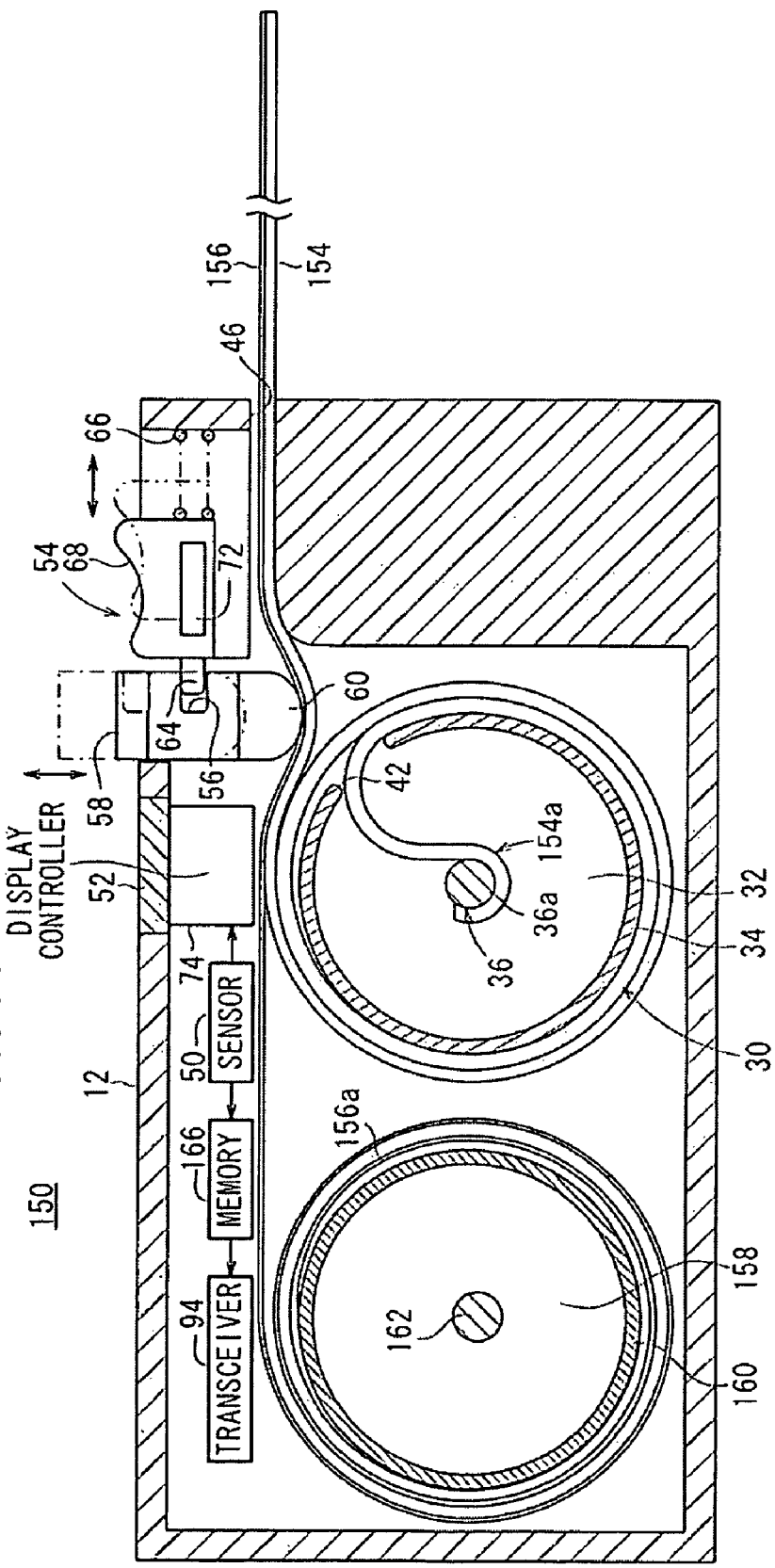
FIG. 14 is a cross sectional view showing an IP cassette.

More specifically, as shown in FIGS. 13 and 14, two winding members (first winding member 30 and second winding member 152) are included inside the roughly rectangular prism shaped casing 12. A stimulable phosphor panel 154 (radiation detection device), in which a radiation image is recorded upon exposure to X-rays that have passed through a subject, is wound on the first winding member 30, and an external light blocking sheet 156 is wound on the second winding member 152. One end 154a of the stimulable phosphor panel 154 is affixed to the rotary shaft 36.

The stimulable phosphor panel 154 comprises a flexible base formed by an elongate sheet, and a stimulable phosphor layer formed on the flexible base, such that the stimulable phosphor panel 154 can be wound easily. The first flexible wiring section 24 and the second flexible wiring section 28, like those of the electronic cassette 10, are not present in the stimulable phosphor panel.

Respective scales 48 are provided on the surface of the stimulable phosphor panel 154 and the surface of the external light blocking sheet 156.

The first winding member 30 has roughly the same structure as the winding member of the aforementioned electronic cassette 10. However, since there is no need to supply electrical power to the stimulable phosphor panel 154, an electrical power line and a metallic layer are not formed thereon.

The second winding member 152 has roughly the same structure as the first winding member 30, and includes a second cylindrical section 160 having a hollow portion 158 thereinside, a second rotary shaft 162 that extends in the axial direction of the second cylindrical section 160, and a non-illustrated coil spring attached to the second rotary shaft 162. The second rotary shaft 162 is affixed to the second cylindrical section 160 through disks 164 (or spokes), which are disposed at both ends of the second cylindrical section 160. Accordingly, the second cylindrical section 160 is capable of rotation about the axis of the second rotary shaft 162. Both ends of the second rotary shaft 162 are respectively attached rotatably to the inner wall of the casing 12 through unillustrated bearings. Further, one end 156*a* of the external light blocking sheet 156 is bonded (adhered) to an outer circumferential portion of the second cylindrical section 160.

Furthermore, inside the casing 12 are provided a sensor 50 that detects a pulled out amount of the stimulable phosphor panel 154 (and the external light blocking sheet 156), a stopper mechanism 54 for making variable the pulled out amount of the stimulable phosphor panel 154 (and the external light blocking sheet 156), a liquid crystal display unit 52, a display controller 74, a memory 166 for temporarily storing the pulled out amount, and a transceiver 94 for transmitting data, which is stored in a memory, based on reception of a transmission request signal from the exterior. In place of the battery 76, a non-illustrated small battery cell is provided, for supplying electrical power to the display controller 74, the memory 166 and the transceiver 94.

In addition, a selective pulling mechanism 168 is disposed on the IP cassette 150, for selectively pulling the external light blocking sheet 156.

Figure 15:
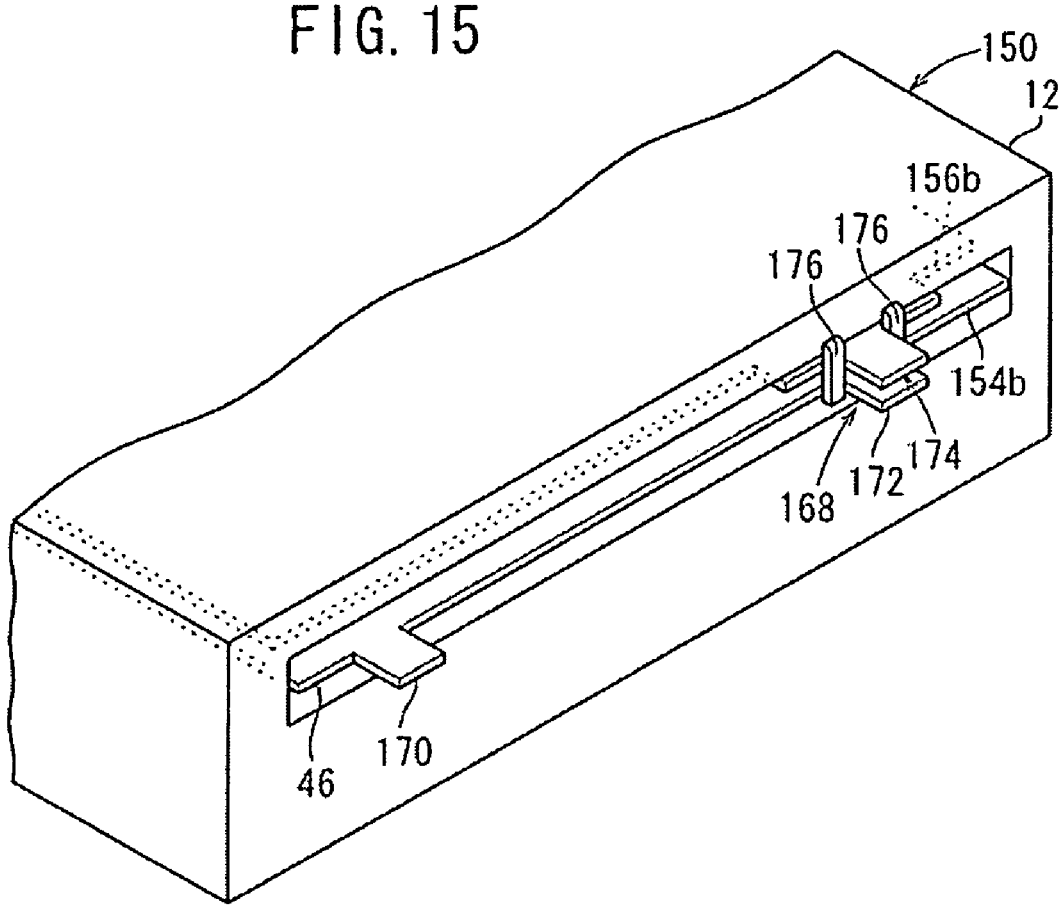
FIG. 15 is an explanatory view showing a selective pulling mechanism.
Figure 16:
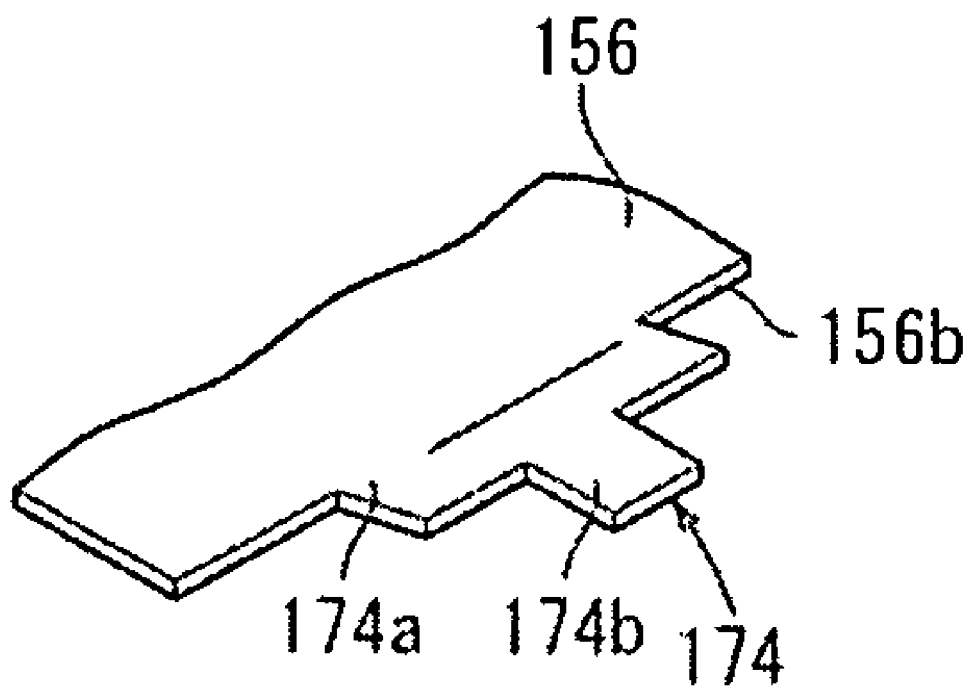
FIG. 16 is a perspective view showing a structural example of a third projected piece of an external light blocking sheet.

As shown in FIG. 15, for example, on the selective pulling mechanism 168, two projecting pieces (first projecting piece 170 and second projecting piece 172) are provided at the other end 154*b* of the stimulable phosphor panel 154, whereas a single projecting piece (third projecting piece 174) is provided at the other end 156*b* of the external light blocking sheet 156. In this case, the second projecting piece 172 of the stimulable phosphor panel 154 and the third projecting piece 174 of the external light blocking sheet 156 are disposed in a mutually confronting relationship. In particular, as shown in FIG. 16, the third projecting piece 174 is made with an integrally formed shape, made up of a first widthwise expanded latching piece 174*a* that projects in an upward slanting direction from the other end 156*b*, and a narrow width projecting piece 174*b* that projects from the center of an end surface of the latching piece 174*a*. Furthermore, for example, two projections 176 are provided, which extend downwardly to an upper plate portion that constitutes the opening 46 of the casing 12. Ends of each of the projections 176 are formed in a confronting relation with an end surface of the latching piece 174*a*.

Figure 17:
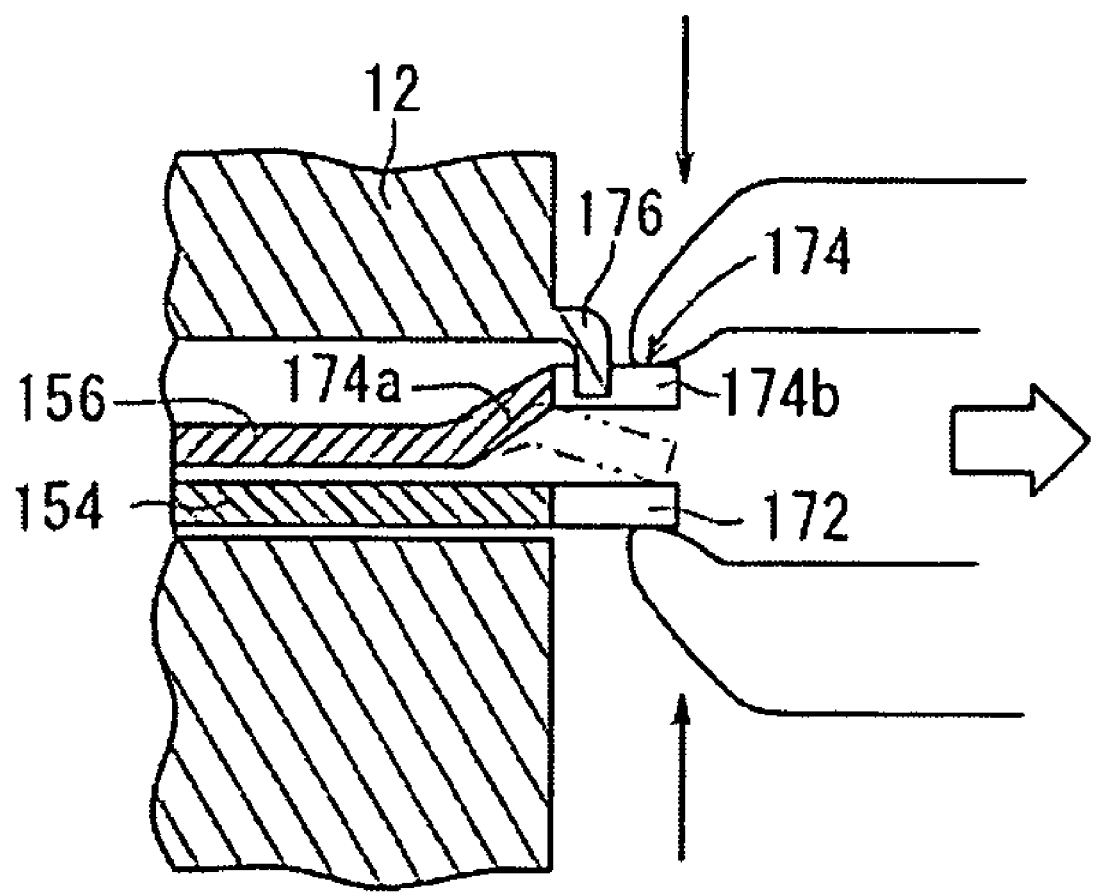
FIG. 17 is an explanatory drawing showing an operational example in the case that a stimulable phosphor panel and an external light blocking sheet are pulled out together.

Accordingly, for example as shown in FIG. 17, as a result of a technician simultaneously grasping the third projecting piece 174 of the external light blocking sheet 156 and the second projecting piece 172 of the stimulable phosphor panel 154, the third projecting piece 174 is moved downwardly. In accordance therewith, latching by the projections 176 with respect to the latching piece 174*a* of the third projecting piece 174 is released, whereby the stimulable phosphor panel 154 and the external light blocking sheet 156 can be pulled out together.

On the other hand, when a technician grasps the first projecting piece 170 of the stimulable phosphor panel 154 and pulls out the stimulable phosphor panel 154, because latching by the projection 176 with respect to the latching piece 174*a* of the third projecting piece 174 is maintained, only the stimulable phosphor panel 154 is pulled out, whereas the external light blocking sheet 156 is not pulled out.

The IP cassette 150 is constructed basically as described above. Next, operations and effects using the IP cassette 150 shall be explained.

Similar to the case of the electronic cassette 10, based on the image capturing conditions and the imaging region, etc., which are confirmed by the technician, the technician determines an optimal size for capturing the image from the IP cassette 150, and pulls out the stimulable phosphor panel 154 together with the external light blocking sheet 156 from the casing 12 of the IP cassette 150, by an amount suitable for the determined size. At this time, the pulled out amount is displayed as numerical data (text) on the liquid crystal display unit 52, and the numerical data is stored in the memory 166.

In addition, at a stage where the stimulable phosphor panel 154 and the external light blocking sheet 156 have been pulled out by a required amount, the technician presses the stop button 58 for thereby fixing the stimulable phosphor panel 154 and the external light blocking sheet 156 in place. In this condition, the technician positions the stimulable phosphor panel 154 and the external light blocking sheet 156, which have been pulled out from the IP cassette 150, over a desired image capturing region of the patient, which was selected from the image capturing menu.

Once the stimulable phosphor panel 154 and the external light blocking sheet 156 have been placed in an appropriate state with respect to the patient, the technician operates the image capturing switch of the portable information terminal in order to carry out capturing of the radiation image.

After capturing the radiation image, the technician operates the release button 68 by sliding it. Owing thereto, fixing of the stimulable phosphor panel 154 and the external light blocking sheet 156 due to pressing by the bar 60 is released. The stimulable phosphor panel 154 is wound up on the cylindrical section 34, and the external light blocking sheet 156 is wound up on the second cylindrical section 160, such that only the first projecting piece 170 and the second projecting piece 172 of the stimulable phosphor panel 154, together with the third projecting piece 174 of the external light blocking sheet 156, remain exposed from the opening 46.

Figure 18:
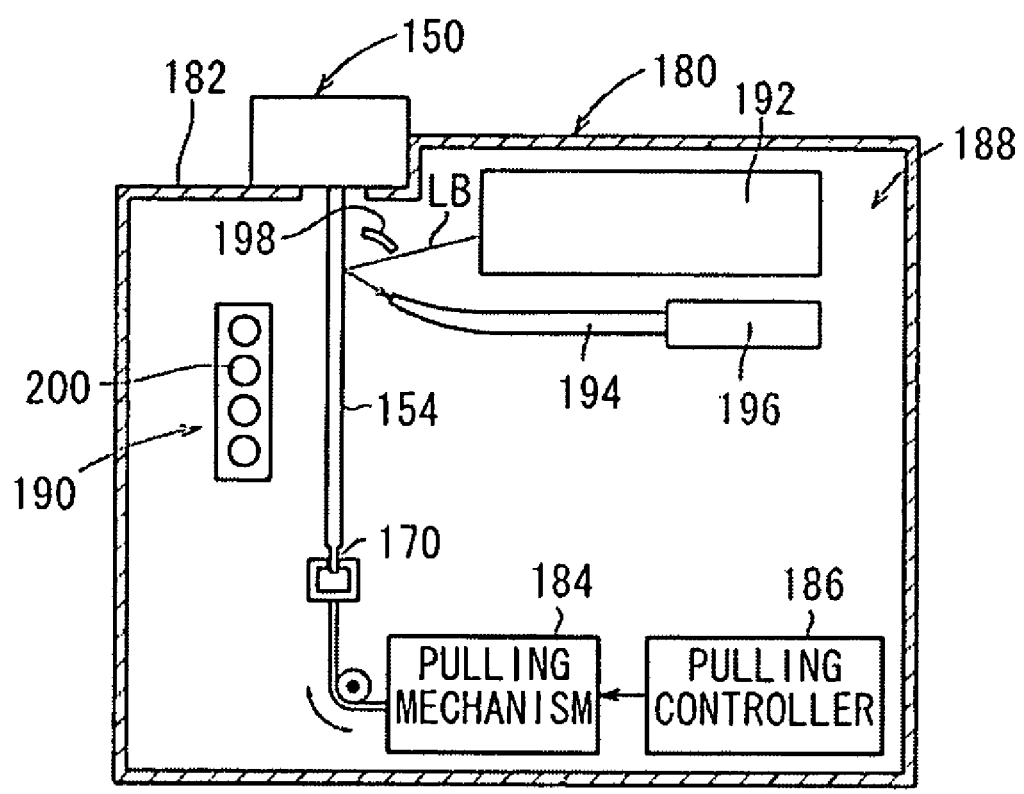
FIG. 18 is a schematic view showing an example of an image reading apparatus corresponding to the IP cassette.

Thereafter, in order to read out the radiation image information recorded in the stimulable phosphor panel 154 of the IP cassette 150, the technician sets the IP cassette 150 on an image reading apparatus 180, as shown in FIG. 18.

The image reading apparatus 180 has a configuration that corresponds to the IP cassette 150. Specifically, the image reading apparatus 180 includes a loading platform 182 on which the IP cassette 150 is loaded, a pulling mechanism 184 for gripping the first projecting piece 170 of the stimulable phosphor panel 154 in the loaded IP cassette 150 and pulling the first projecting piece 170 downward, a pulling controller 186 for controlling an amount by which the stimulable phosphor panel 154 is pulled out by the pulling mechanism 184 based on data from the transceiver 94 of the IP cassette 150, a scanning unit 188 for reading the radiation image information that is stored cumulatively in the pulled out stimulable phosphor panel 154, and an erasing unit 190 for erasing the residual radiation image information remaining in the stimulable phosphor panel 154 after reading processing has been completed.

The scanning unit 188 is equipped with an excitation unit 192 for directing and scanning a laser beam LB, which serves as stimulating light, in a direction perpendicular to a direction in which the stimulable phosphor panel 154 is transported, a light collecting guide 194 for converging stimulated light pertaining to the radiation image information, which is emitted due to stimulation by the laser beam LB, and a photomultiplier 196 that converts the stimulated light converged by the light collecting guide 194 into electrical signals. At one end of the light collecting guide 194, a converging mirror 198 is disposed in the vicinity thereof for increasing the light collection efficiency of the stimulated light. The erasing unit 190 includes a plurality of erasing light sources 200 formed from cold cathode tubes, which output erasing light.

An explanation shall now be given concerning a case in which an IP cassette 150, which accommodates a stimulable phosphor panel 154 therein in which radiation image information has been cumulatively stored, is loaded onto the image reading apparatus 180, and a reading process is carried out.

When the IP cassette 150 is placed on the loading platform 182, the pulling controller 186 outputs a transmission request signal with respect to the IP cassette 150. The transceiver 94 inside the IP cassette 150 reads out and transmits data (pulled out amount data) indicating the pulled out amount from the memory 166 based on reception of a transmission request signal from the pulling controller 186. The pulling controller 186 secures (i.e., stores in a register or the like) the pulled out amount data from the IP cassette 150, and then drives the pulling mechanism 184.

The pulling mechanism 184 grips the first projecting piece 170, which is exposed from the opening 46 of the IP cassette 150, and pulls the stimulable phosphor panel 154 downwardly (i.e., transports in an auxiliary scanning direction) at a constant speed. Upon gripping and pulling the first projecting piece 170, the external light blocking sheet 156 is not pulled out, but only the stimulable phosphor panel 154 is pulled out from the IP cassette 150.

Together with transporting the stimulable phosphor panel 154 in the auxiliary scanning direction, the laser beam LB is scanned in a main scanning direction on the stimulable phosphor panel 154 from the excitation unit 192, whereby a reading process of the radiation image information is carried out. More specifically, when the laser beam LB output from the excitation unit 192 irradiates the stimulable phosphor panel 154, stimulated light is output from the stimulable phosphor panel 154 corresponding to the radiation image information. The stimulated light is guided to the photomultiplier 196 by the light collecting guide 194, and is converted into radiation image information as electrical signals.

The pulling out operation of the stimulable phosphor panel 154 from the IP cassette 150 by the pulling mechanism 184 continues until it is pulled to a length corresponding to the pulled out amount data secured in the pulling controller 186. In addition, at a stage when a length corresponding to the pulled out amount data has been pulled out, the radiation image information recorded in the stimulable phosphor panel 154 is read out. The read out radiation image information is transmitted, for example, to the console.

After the radiation information has been read, the residual radiation image information remaining in the stimulable phosphor panel 154 is erased by erasing light, which is output from the erasing light sources 200 that make up the erasing unit 190. Thereafter, the pulling controller 186 is driven so that the pulling mechanism 184 moves the stimulable phosphor panel 154 in a direction opposite to the pulling direction, i.e., in a direction so that the stimulable phosphor panel 154 becomes accommodated inside the IP cassette 150. Consequently, the stimulable phosphor panel 154 is wound up by the first winding member 30 inside the casing 12, for use when a subsequent image is captured.

In the foregoing manner, in the IP cassette 150, similar to the aforementioned electronic cassette 10, a flexible stimulable phosphor panel 154 can be used by being pulled out optionally from the IP cassette 150, the image capturing capable size thereof can be freely varied, and thus, images can be captured effectively at a variety of regions.

In addition, the IP cassette 150 can be made lightweight, so that large restrictions are not placed on the technician when transporting or using the IP cassette 150. Further, when not in use, since the stimulable phosphor panel 154 can be wound up and accommodated inside the rectangular prism shaped casing 12, the IP cassette 150 can be stored in a compact manner on a storage shelf or the like.

In particular, with the IP cassette 150, since the selective pulling mechanism 168 for pulling out the external light blocking sheet 156 is provided, the external light blocking sheet 156 can be pulled out together with the stimulable phosphor panel 154 when an image is captured, and when the image is read, only the stimulable phosphor panel 154 can be pulled out by itself. Therefore, adverse effects due to external light at the time of capturing the image can be controlled, whereas unnecessary blockage of laser light when the image is read out can be prevented.

Further, because the pulling mechanism 184 that pulls out the stimulable phosphor panel 154 from the IP cassette 150 is provided in the image reading apparatus 180, as a mechanism for loading the IP cassette 150, only the loading platform 182 with a degree sufficient for loading the compact IP cassette 150 can be provided. Therefore, the size of the image reading apparatus 180 also can be made smaller in scale, conserving space within the image capturing room, or enabling the space where a technician can move to be enlarged, thus promoting the prevalence of X-ray imaging.

Of course, the present invention is not limited to the above-described embodiments, and the invention can be freely modified, within a range that does not deviate from the essence and gist of the present invention.

For example, the radiation detection device 14 accommodated in the electronic cassette 10 converts the radiation dose of the irradiated radiation X directly into electric signals through the photoelectric conversion layer 110. However, in place of this structure, a radiation detection device in which irradiated radiation X is converted initially into visible light by a scintillator, and thereafter, the visible light is converted into electric signals using a solid-state detector element formed from amorphous silicon (a-Si) or the like, may also be used (see, Japanese Patent No. 3494683).

What is claimed is:

1. A radiation detection apparatus including a casing and a radiation detection device accommodated inside the casing, which detects radiation emitted from a radiation source and having passed through a subject, and converts the radiation into radiation image information, further comprising:
   a winding member accommodated rotatably inside of the casing,
   the radiation detection device comprising a flexible base, wherein the radiation detection device is wound on the winding member, and a portion of the radiation detection device is capable of being pulled outside of the casing.

2. The radiation detection apparatus according to claim 1, further comprising a plurality of imaging elements formed on the flexible base.

3. The radiation detection apparatus according to claim 1, further comprising a stopper mechanism for varying an amount at which the radiation detection device is pulled out.

4. The radiation detection apparatus according to claim 1, further comprising a sensor for detecting the amount at which the radiation detection device is pulled out.

5. The radiation detection apparatus according to claim 1, wherein a scale is provided on a surface of the radiation detection device.

6. The radiation detection apparatus according to claim 2, wherein:
   the winding member includes a hollow portion; and
   an electronic circuit is mounted inside the hollow portion, wherein the electronic circuit includes at least a reading circuit for reading radiation image information, which has been converted by the radiation detection device.

7. The radiation detection apparatus according to claim 6, wherein supply of electrical power to the radiation detection device and the electronic circuit from a power supply is implemented through a brush method.

8. The radiation detection apparatus according to claim 6, wherein supply of electrical power to the radiation detection device and the electronic circuit from a power supply is implemented through a wire method.

9. The radiation detection apparatus according to claim 6, wherein supply of electrical power to the radiation detection device and the electronic circuit from a power supply is implemented through an electromagnetic induction method.

10. The radiation detection apparatus according to claim 7, wherein the power supply comprises a battery, which is accommodated inside the casing together with the winding member.

11. The radiation detection apparatus according to claim 6, wherein the electronic circuit comprises a communication circuit for transmitting the radiation image information from the reading circuit wirelessly.

12. The radiation detection apparatus according to claim 6, further comprising:
   an input/output interface, which is accommodated inside the casing together with the winding member;
   the electronic circuit comprises a communication circuit for transmitting the radiation image information from the reading circuit wirelessly to the input/output interface; and
   wherein the input/output interface externally outputs at least the received radiation image information.

13. The radiation detection apparatus according to claim 12, wherein a wireless communication medium comprises one of radio waves (having a frequency greater than or equal to 3 kHz and less than or equal to 3 terahertz) and infrared light.

14. The radiation detection apparatus according to claim 1, further comprising a mechanism provided in the casing for selectively pulling out an external light blocking sheet.

* * * * *